United States Patent Office 3,610,135
Patented Oct. 5, 1971

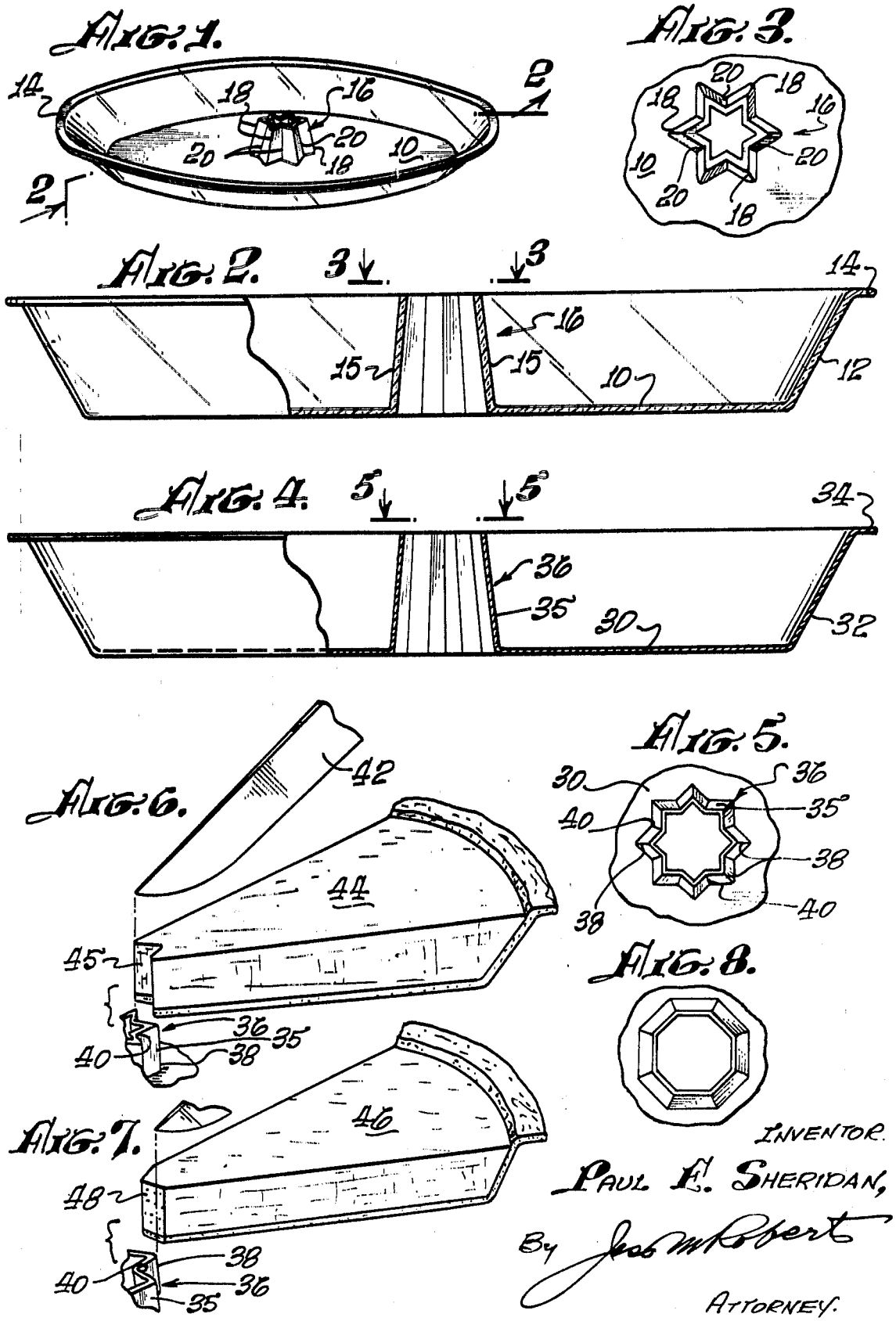

3,610,135
PIE PAN
Paul E. Sheridan, Ontario, Calif.
(605 E. Ontario Ave., Corona, Calif. 91720)
Filed Dec. 15, 1969, Ser. No. 884,824
Int. Cl. A47j 37/01
U.S. Cl. 99—430
6 Claims

ABSTRACT OF THE DISCLOSURE

A pie pan is formed with a central flue for balanced baking and the flue is of a non-circular cross section with equally spaced ridges and equally spaced grooves for guidance in cutting the pie into equal segments.

BACKGROUND OF THE INVENTION

It is well known that a pie baked in a conventional pie pan is baked to greater degree in the outer radial region of the pie than in the center region. Thus the housewife is forced to choose between having the finished pie either properly baked in its outer radial region and underbaked in its central region or properly baked in its central region and overbaked in its outer radial region.

It is a further fact that almost always when a housewife attempts to cut a pie in equal segments, she fails to do so, the resulting pie segments varying substantially in size.

The primary object of the present invention is to avoid these disadvantages by enabling a housewife to produce a substantially uniformly baked pie and by enabling the housewife to cut the pie into substantially equal segments.

SUMMARY OF THE INVENTION

The pie pan of the present invention is of annular configuration in plan with an inner circumferential wall forming a flue for the upward flow of hot gases therethrough to cause the heat transmitted to the inner radial region of the pie to be balanced with the heat delivered to the outer radial region of the pie.

To provide adequate guidance for cutting the pie radially into equal segments, the flue is of non-circular configuration with equally circumferentially spaced upwardly extending external ridges. Merely sighting on the ridges and starting the knife cuts at the successive ridges results in cutting the pie radially into substantially equal triangular segments.

Preferably the flue is star-shaped in cross-sectional configuration with equally circumferentially spaced upwardly extending ridges alternating with equally circumferentially spaced upwardly extending grooves. Such a pie pan is versatile with respect to the manner in which the flue may be used for guidance in cutting the pie and also with respect to the specific shape of the resulting pie segments. Thus if the points of the star-shaped configuration are used for guidance in cutting the pie, the inner ends of the segments will be pointed or convex and the grooves are V-shaped in cross section, the inner ends of the pie segments being of corresponding tapered configuration. On the other hand, if the grooves are used for cutting guides the inner ends of the pie segments will be concave or reentrant.

An advantage of a star-shaped configuration with grooves in V-shaped cross section, is that the end of the knife may be urged into the grooves above the upper surface of the pie and thus mechanically engaged by the grooves to center the knife relative to the grooves before the knife enters the pie, and to guide the knife downward, the result being a high degree of accuracy in cutting the pie into equal segments.

The features and advantages of the invention may be understood from the following detailed description and the accompanying drawing.

BRIEF DESCRIPTION OF THE DRAWING

In the drawing, which is to be regarded as merely illustrative:

FIG. 1 is a perspective view of one embodiment of the invention;

FIG. 2 is a view partly in elevation and partly in section showing the same embodiment;

FIG. 3 is a fragmentary plan view showing the configuration of the central flue, the view being taken along the line 3—3 of FIG. 2;

FIG. 4 is a view partly in side elevation and partly in section illustrating a second embodiment of the invention;

FIG. 5 is a fragmentary plan view showing the configuration of the flue as seen along the line 5—5 of FIG. 4;

FIG. 6 is a diagrammatic view showing how a knife may be employed in radial alignment with a ridge of a flue of the pie pan to result in pie segments that are reentrant at their inner ends;

FIG. 7 is a similar view showing how a knife may be mechanically engaged with the successive grooves of the flue of the pie pan above the level of the top surface of the pie to guide the knife accurately into penetration with the pie to result in pie segments that are tapered at their inner ends; and FIG. 8 is a view similar to FIG. 5 showing another configuration for the flue.

DESCRIPTION OF THE SELECTED EMBODIMENTS OF THE INVENTION

The first embodiment of the invention shown in FIGS. 1 to 3, which may be made of heat-resistant glass or any other suitable material, is of generally annular configuration with a flat bottom wall 10, an outer circumferential flared wall 12 terminating in a circumferential rim flange 14 and an inner circumferential wall 15 forming an axial flue 16. The flue 16 is illustrated as tapering upwardly but need not so taper.

In all forms of the invention, the axial flue is formed with upwardly extending ridges that may serve as guides for cutting the pie radially into equal segments. In this first embodiment of the invention, the axial flue 16 has the shape in cross-sectional configuration of a six-pointed star as best shown in FIG. 3, the six points of the star forming six equally circumferentially spaced upwardly extending ridges 18 which alternate with six equally circumferentially spaced upwardly extending grooves 20.

The second embodiment of the invention shown in FIGS. 4 and 5, which may be made of metal or any other suitable material, is of similar generally annular configuration in plan with a flat bottom wall 30, an outer circumferential flared wall 32 having a rim flange 34 and an inner circumferential wall 35 forming an upwardly extending tapered axial flue, generally designated 36.

The axial flue 36 may have the cross-sectional configuration of an eight-pointed star as best shown in FIG. 5 with the eight points of the star forming eight equally circumferentially spaced upwardly extending ridges 38 alternating with eight equally circumfrentially spaced upwardly extending grooves 40 that are V-shaped in cross-sectional configuration.

It is apparent that each of the two embodiments of the invention has an axial flue through which hot gases may flow upward for heat transfer to the central region of the pie to cause the baking of the central region of the pie to be balanced with the baking of the outer radial region of the pie.

It may be readily understood how the flue of such a pie pan may be used for guidance in cutting the pie into equal segments. In this regard it is to be noted that the flue of a pie pan is intended to extend above the level of the top surface of the pie so that the flue may be used for guidance in initially poising the knife above the pie so that once the knife is correctly positioned it may be lowered to penetrate the pie precisely at the desired point.

FIG. 6 shows diagrammatically how the leading end of a knife 42 may be urged into the eight grooves 40 of the second embodiment of the invention in succession to cause the grooves to guide the knife end into positions accurately centralized relative to the grooves for the purpose of poising the knife in correct positions above the upper surface of the pie. With the grooves 40 guiding the knife, the knife is moved downward to cut completely through the pie and then the knife is drawn radially to complete each radial cut. The result is to divide the pie into eight equal segments 44, each of the segments being reentrant or recessed at its inner end as indicated at 45.

In like manner, FIG. 7 shows how the leading end of the knife 45 may be positioned at the upper ends of the eight ridges 38 of the second embodiment of the invention in succession to poise the knife in correct positions for lowering the knife into the pie. The result of using the central flue for guidance in cutting the pie in this manner is division of the pie into eight equal segments 46 with each segment shaped with a tapered end 48. It may be seen that the tapered end 48 is of pleasing configuration, the angle of the taper being substantially greater than the angle of overall taper of the pie segment 46.

FIG. 8 shows how the flue may be of polygonal cross section if desired. In this instance the flue is of octagonal cross-sectional configuration to provide eight ridges for guidance in cutting a pie.

My description in specific detail of the two selected embodiments of the invention will suggest various changes, substitutions and other departures from my disclosure within the spirit and scope of the invention.

I claim:
1. A pie pan for baking a pie,
said pie pan being of the depth of a conventional pie pan,
said pie pan being of annular configuration in plan with an outer peripheral wall, an inner peripheral wall and a flat bottom wall,
said inner peripheral wall forming a flue for upward flow of hot gases therethrough to balance the baking of the inner radial region of the pie with the baking of the outer radial region of the pie,
said flue being non-circular in cross-sectional configuration and being formed with outer ridges extending upward from said bottom wall,
said ridges being equally spaced around the circumference of the flue to serve as guides to facilitate cutting the pie radially into equal generally triangular segments.

2. A pie pan as set forth in claim 1 in which the flue is star-shaped in cross-sectional configuration with said ridges forming the points of the star, whereby cutting the pie along radial lines from the ridges results in equal pie segments with tapered inner ends.

3. A pie pan as set forth in claim 1 in which the cross-sectional configuration of the flue is reentrant between the ridges whereby cutting the pie radially in alignment with the ridges of the flue resutls in the pie segments being formed with convex inner ends.

4. A pie pan as set forth in claim 3 in which each reentrant portion of the flue as seen in cross section is defined by two converging lines whereby cutting the pie radially in alignment with the ridges of the flue results in the pie segments being formed with tapered inner ends, the angle of taper of the inner ends being greater than the overall angle of taper of the pie segments.

5. The pie pan as set forth in claim 1 in which said flue is star-shaped in cross-sectional configuration with equally circumferentially spaced guide grooves extending upward from said bottom wall,
said grooves being V-shaped in cross section to serve as means to mechanically engage the end of a knife for guidance of the knife to facilitate cutting the pie along lines in radial alignment with the grooves to result in equal pie segments with reentrant inner ends.

6. A pie pan as set forth in claim 1 in which the flue is octagonal in cross-sectional configuration forming eight ridges, whereby cutting the pie along radial lines from the ridges results in eight equal pie segments with blunt inner ends.

References Cited

UNITED STATES PATENTS

| | | | |
|---|---|---|---|
| 647,447 | 4/1900 | Herrick | 99—352 |
| 692,919 | 2/1902 | Schaumloeffel et al. | 99—439 X |
| 2,093,307 | 9/1937 | Cline | 9—430 |
| 2,167,729 | 8/1939 | Shelton et al. | 99—430 |
| 2,231,223 | 2/1941 | Page. | |
| 2,667,829 | 2/1954 | McNutt | 99—430 |

WALTER A. SCHEEL, Primary Examiner

A. O. HENDERSON, Assistant Examiner

U.S. Cl. X.R.

99—428; 249—52